United States Patent
Bower et al.

Patent Number: 5,626,009
Date of Patent: May 6, 1997

[54] A-RAKE-A-HOE

[76] Inventors: Bob L. Bower; Betty Carrington, both of 8215 N. Oracle Rd. #199, Tucson, Ariz. 85704

[21] Appl. No.: 329,947

[22] Filed: Jan. 23, 1995

[51] Int. Cl.$^6$ ........................................ A01D 7/10
[52] U.S. Cl. ........................ 56/400.06; 56/400.18
[58] Field of Search ............... 56/400.18, 400.06, 56/400.19

[56] References Cited

U.S. PATENT DOCUMENTS

| | | | |
|---|---|---|---|
| D. 331,353 | 12/1992 | Valentine | D8/13 |
| 2,083,786 | 6/1937 | Jerner et al. | 56/400.18 |
| 3,258,903 | 7/1966 | Rienacker et al. | 56/400.18 |
| 3,701,243 | 10/1972 | Durkee | 56/400.18 |
| 4,212,150 | 7/1980 | Dmochowski | 56/400.06 |
| 4,483,133 | 11/1984 | Pasley | 56/400.06 |
| 4,901,515 | 2/1990 | McLeod et al. | 56/400.18 |

*Primary Examiner*—Terry Lee Melius
*Assistant Examiner*—Heather Shackelford

[57] ABSTRACT

A-Rake-A-Hoe is a combination raking and hoeing implement wherein a sliding head allows the tines of the rake to be fully extended for raking leaves, fully retracted for tilling or adjusted to any position therebetween. A hoe is mounted to the sliding head, wherein a lever is used to lock the head in place as well as unlock the head for slidable movement.

1 Claim, 1 Drawing Sheet

RAKE EXTENDED

RAKE RETRACTED

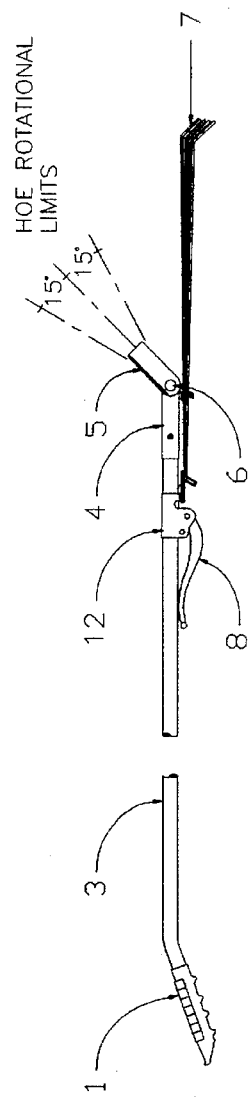
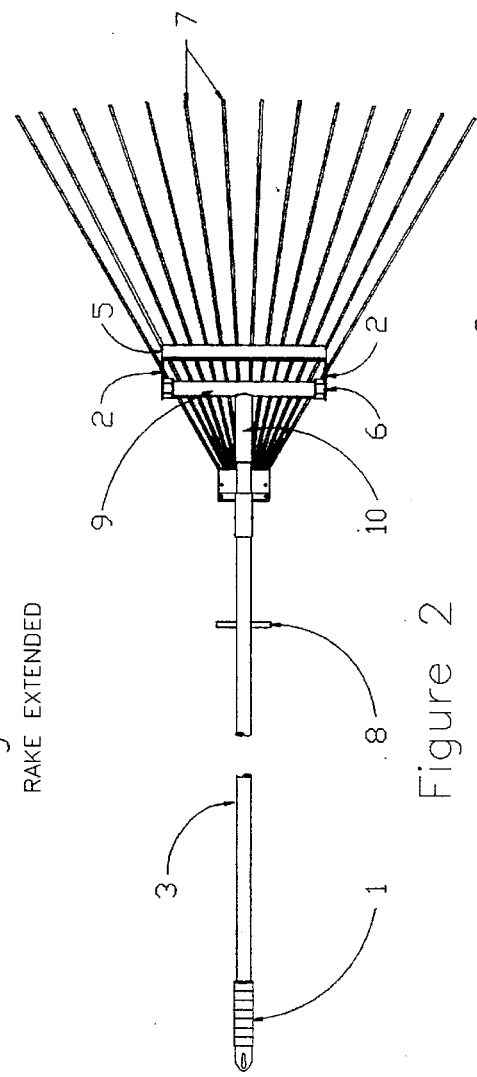
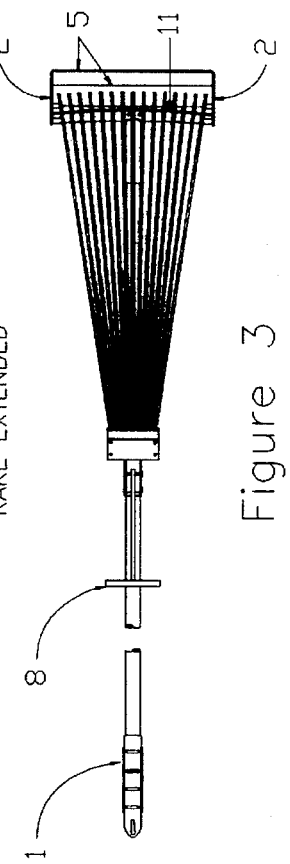
Figure 1 RAKE EXTENDED
Figure 2 RAKE EXTENDED
Figure 3 RAKE RETRACTED

A-RAKE-A-HOE

FIELD OF THE INVENTION

Adjustable rake and hoe combination.

BACKGROUND OF THE INVENTION

This invention relates to general weeding, tilling, cultivating, and general raking operations.

The object of this invention is to have a convenient hand tool with multi-purposes and the convenience of one tool for a variety of tasks.

A hand rake having a plurality of tines whose spread is adjustable in width and rigid for different operations.

SUMMARY OF THE INVENTION

It is an object of this invention to provide a raking tool with multi-purposes. Examples are: spread wide for large leaves, debris, weeds, etc. Closed part way For smaller leaves, weeds, pine needles, rocks, etc. Closed tightly for light cultivating, tilling, fine debris, and small rock clean up.

It is an object of this invention to provide a tool which may be used to pick up leaves, weeds, pine needles, small rocks, and debris. This tool when turned over, (tines facing upward), may be used to pick up accumulated leaves, weeds, etc. by adjusting line spread for task at hand and sliding tines under object to be removed and lifting upward and dumping into container.

It is an object of this invention to reduce time and energy by having one rake to supplement a variety of rake sizes and specialties. It also is the function of this invention to have a weed cutting devise attached (hoe) for cutting unwanted weeds and plants.

It is the object of this invention to save time by having cutting devices, (hoe) securely mounted on the top part of the time holder. By retracting tines fully and turning the rake over, (tines upward) it is a hoe which is fully functional for hoeing weeds, unwanted grass, plants, etc.

It is the object of this invention to have a hand tool for additional tilling, cultivating, loosening soil and weeding.

It is also the object of this invention to reduce motion by having a cutting, tilling, loosening, weeding function by both pushing and pulling the tool forward and backward through the soil and utilizing cutting edges employed on both sides of the hoe blade.

DESCRIPTION OF PRIOR ART

The prior art is replete with a multitude of tools. When used, will accomplish certain tasks with varying degrees of success. Such tools falling into broad individual categories such as shovels, hoes, rakes and then into multiple sub categories.

Each tool is employed to perform a particular task or function. This requires a variety of tools. Some particular tools such as the rake, require a variety of sizes and strengths to accomplish the particular task at hand.

In weeding and general dean up a variety of tools are required. This requires weeding, raking, and ultimately picking up debris for disposal. This process would require a hoe, a rake, and shovel or pitch fork, creating a need for several tools and additional time looking for the proper tool. Also time and effort lost in exchanging the proper tool for the particular task. Furthermore, there are many instances in which it would be advantageous to use a multi-purpose tool to perform the various operations required.

The adjustment mechanism used to secure the times for similar adjustable rakes lacks a one motion operation and requires more time to lock tines into proper position.

BRIEF DESCRIPTION OF THE DRAWINGS

FIG. 1 is a top side elevational view of the invention with the tines fully spread.

FIG. 2 is a top elevational view of FIG. 1

FIG. 3 is a bottom view of the invention with the tines fully retracted.

DETAILED DESCRIPTION OF THE PREFERRED EMBODIMENT

Referring FIG. 1 of the drawings, A-Rake-A-Hoe is shown having a suitable hand grip 1 which is fit over the handle 3. The hand grip enables the user a surface for gripping providing four finger grips. The handle 3 is formed of an elongated tubing of any suitable material such as high tech plastic, fiberglass, aluminum, etc. The length can be made to any suitable length.

A suitable rake/hoe head 4 is designed to support the rake tines in any selected position as well as providing a connection to the handle 3. The head is made of a T-shaped hollow connector 9, 10 and a lower cross bar 11. The T-shaped connector has a connecting bolt 6 extending though the top cross portion 9 of the T connector, and the handle is inserted into the leg 10 of the T and rigidly connected thereto. The lower crossbar 11 has a plurality of equally spaced apertures along its length, into which the tines of the rake are inserted with a desired clearance between each tines and each aperture. It is clear that when the head 4 is adjacent the handle, the tines are spread to its maximum extent such that it is in a position for raking leaves, etc. Since the spacing between the apertures on the crossbar are fixed, the tines are drawn closer together as the crossbar is moved toward the distal end of the tines.

A lever 8 has a connecting sleeve 12 which is slidable with respect to the handle 3, wherein the lever has a cam mechanism which in a position resting on the handle as shown in FIG. 1, is in a locked position. And when the lever is pulled downwardly such that it is essentially perpendicular to the handle, it is in a loosened, unlocked position such that the lower cross bar 11 can slide freely along the length of the tines thereby adjusting the tool as needed. For example, as shown in FIG. 1, in the extended position, it is in a position for raking leaves, weeds or any larger debris. In a retracted position with the tines still facing downward, it can be used to for raking up rocks, as well as fine weeds, grass and hard to pick-up materials. It is also exceedingly effective for light tilling and hard to reach areas. In this retracted state, the rake/hoe can be turned over as seen in FIG. 3 and used as a hoe to make weeding effortless. The unique double edge cutting blade reduces tension and wasted time and energy. At any mid-extended stated, the rake can serve as a sturdy tool that can be used for desert landscaping and is extremely effective for heavier debris, such as rocks and hard to reach areas under stairways or bushes.

The positioning of the blade 5 on the head 4 is such that it is set at a suitable angle set in a direction away from which the tines are bent so that they do not interfere with the raking operation. This also allows enough clearance between the blade and the bent tines such that there is no interference of the tines during the hoeing operation. It is obvious from the lever cam mechanism and its relation to the handle, as well as the clearance of the tines in the apertures of the crossbar 9, that the head 4 can slide freely with respect to the tines. In this way, the spacing between the tines can be adjusted to any position between the fully extended position of FIG. 2 and the fully retracted position of FIG. 3.

The blade 5 is a self sharpening, two-way blade, which can be used for cutting purposes when the tool is pushed away from or toward the user when in use. The bolt 6 projects transversely through ears 2 and connects the ears 2 of the blade 5 to the head. The blade can also be attached in such a manner that it can tilt with respect to the bolt axis approximately ±15° as shown in FIG. 1.

The A-Rake-A-Hoe is sturdy, durable and made with 14 gauge steel. The cutting edge can be forged, tempered steel, designed and engineered to withstand the most rugged terrain, eliminating the effort in landscaping and yard work. The tines are made of spring steel. The design makes the adjusting the rake to any position a simple task.

Although the invention has been shown and described in what is conceived to be the most practical and preferred embodiment, it is recognized that departures may be made therefrom within the scope of the invention and is not limited to the illustrative details disclosed.

We claim:

1. A combination raking and hoeing apparatus comprising:

a handle having a longitudinal axis having an adjusting means and a tool attached to one end of the handle;

the tool comprising a rake portion having tines and a hoe portion, the rake and hoe portions attached to the handle by a T-shaped head portion;

the T-shaped head portion having a cross portion having a midpoint along its length, and a leg portion having an open end, the cross portion extending substantially perpendicular to the longitudinal axis of the handle and having a plurality of spaced apertures into which individual tines are inserted, the leg portion extending perpendicularly from the midpoint of the cross portion, wherein the handle is inserted into the open end of the leg portion and rigidly attached thereto, the hoe portion having an elongated blade with ears extending perpendicularly from each end of the blade, each ear having means for attachment to the cross portion of the head, the adjusting means having a lever for locking and unlocking the position of the head such that the hoe element, attached to the cross portion of the head is slidably adjustable along the length of the tines with the head, wherein positioning the lever in the locked position prevents the movement of the head and positioning the lever in the unlocked position allows the head, with the hoe portion attached thereto, to move freely along the length of the tines.

* * * * *